United States Patent
Kotzur et al.

(10) Patent No.: US 10,753,740 B2
(45) Date of Patent: Aug. 25, 2020

(54) GEODETIC SURVEYING

(71) Applicant: LEICA GEOSYSTEMS AG, Heerbrugg (CH)

(72) Inventors: Norbert Kotzur, Altstätten (CH); Gerhard Kleemaier, Dornbirn (AT); Hannes Maar, Dornbirn (AT); Gian-Philipp Patri, Dornbirn (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 236 days.

(21) Appl. No.: 15/993,377

(22) Filed: May 30, 2018

(65) Prior Publication Data

US 2018/0347980 A1 Dec. 6, 2018

(30) Foreign Application Priority Data

May 31, 2017 (EP) .................................... 17173831

(51) Int. Cl.
*G01C 15/00* (2006.01)
*G01S 17/08* (2006.01)

(52) U.S. Cl.
CPC ............ *G01C 15/008* (2013.01); *G01S 17/08* (2013.01)

(58) Field of Classification Search
CPC .................................................. G01C 15/008
USPC .................................................. 33/290, 292
See application file for complete search history.

(56) References Cited

U.S. PATENT DOCUMENTS

| | | | |
|---|---|---|---|
| 4,136,955 A * | 1/1979 | Aeschlimann | G01C 1/02 250/231.1 |
| 5,671,160 A * | 9/1997 | Julian | G01C 15/00 33/293 |
| 6,138,367 A * | 10/2000 | Raby | G01C 1/02 33/1 CC |
| 7,583,373 B2 | 9/2009 | Schwarz | |
| 2007/0104353 A1 | 5/2007 | Vogel | |
| 2007/0180716 A1* | 8/2007 | Hertzman | G01C 15/002 33/290 |
| 2009/0024342 A1 | 1/2009 | Hertzman et al. | |
| 2013/0192072 A1* | 8/2013 | Gnepf | G01B 11/26 33/228 |

(Continued)

FOREIGN PATENT DOCUMENTS

| | | |
|---|---|---|
| CN | 1147083 A | 4/1997 |
| CN | 1727845 A | 2/2006 |

(Continued)

OTHER PUBLICATIONS

Extended European Search Report dated Nov. 27, 2017 as received in Application No. 17173831.3.

*Primary Examiner* — Christopher W Fulton

(74) *Attorney, Agent, or Firm* — Maschoff Brennan

(57) ABSTRACT

A geodetic surveying instrument, such as a total station, stationed with instrument center coordinates at ground coordinates in a stationing height above ground. The instrument comprises a sighting unit for aiming a measurement target point, with an opto-electronic distance meter to determine a target distance and two axes for aiming the sighting unit, with goniometers to determine a target direction. It also comprises a tilt sensor to determine a tilt value of the instrument and a measurement-controller to derive measured coordinates of the measurement target point based on this target direction and target distance.

15 Claims, 6 Drawing Sheets

(56) References Cited

U.S. PATENT DOCUMENTS

| | | | |
|---|---|---|---|
| 2015/0176991 A1 | 6/2015 | Maruyama | |
| 2015/0219455 A1* | 8/2015 | Jordil | G01C 9/00 |
| | | | 33/228 |
| 2016/0076885 A1* | 3/2016 | Nishita | G01C 15/008 |
| | | | 33/292 |
| 2019/0186912 A1* | 6/2019 | Ohtomo | G01C 15/006 |

FOREIGN PATENT DOCUMENTS

| | | |
|---|---|---|
| CN | 104457684 A | 3/2015 |
| CN | 106405603 A | 2/2017 |
| CN | 106546229 A | 3/2017 |
| EP | 1 686 350 A1 | 8/2006 |
| EP | 1 836 457 A1 | 9/2007 |
| EP | 2 453 205 A1 | 5/2012 |
| EP | 2 998 701 A1 | 3/2016 |

\* cited by examiner

GEODETIC SURVEYING

CROSS-REFERENCE TO RELATED APPLICATIONS

This application claims priority to European Patent Application No. 17173831 filed on May 31, 2017. The foregoing patent application are incorporated herein by reference.

FIELD OF INVENTION

The present invention relates generally to a surveying instrument and to a corresponding method of deriving target point coordinates.

BACKGROUND

In surveying, in particular land surveying, it is an object to determine geometrical properties of one or more target points, like coordinates, distances, and orientations. In most instances those properties have to be determined with respect to a known reference system, which can e.g. be defined by one or more known reference points, e.g. embodied by known and/or defined reference marks in vicinity. In many geodetic measurements for example, the surveying instrument is installed above a surface reference mark at ground or above an otherwise embodied, fixed reference—commonly by using a tripod supporting the surveying instrument in a practical and in particular human operable height above ground.

The most common surveying instruments nowadays are so called total stations, which can be described as enhanced embodiments of tachymeters, providing a motorized movement of the aiming direction of an opto-electrical distance measurement, in angular coordinates commonly oriented (at least substantially) horizontal and vertical. Those devices can thereby provide many automated functions and can e.g. comprise features like automatic target recognition (ATR), an image- or video-camera, a sighting unit, a telescope, a GPS-unit, a compass, a wireless remote control, a leveling unit, a visible pilot beam, infrared light emission and detection, a human machine interface, etc. Examples can e.g. be found in US 2007/104353, US 2009/024342, US 2015/176991, EP 1 836 457 or others. Optionally, the present invention can also be applied to other cognate types of surveying instruments such as e.g. Laser-Scanners, Laser-Trackers, classic Tachymeters or Theodolits, etc.

EP 2 998 701 proposes a method for initially installing a surveying instrument on a reference point in order to reference a surveying instrument center to a thereby defined known coordinate system. This stationing includes an approximate installing of the instrument, followed by using a laser distance meter exactly directed in vertical direction of the surveying instruments inherent coordinate system. This laser distance meter has to be exactly targeted to the reference point by tilting the surveying instrument. By determining tilt value and a distance value at the time when the reference point is targeted, a referencing of the tilted surveying instrument center to the reference point is established. Finally, the surveying instrument is leveled by mechanically re-adjusting the tilt, whereupon stationing space coordinates of the exactly leveled surveying instrument center after leveling are concluded based on the mechanical tilt adjustment which was required.

Above described method is done once at time of stationing, in order to speed up the stationing procedure compared to prior art, where the instrument had to be installed exactly vertically over the reference point and manual measurements of instrument height had to be taken. Such was burdensome as in general multiple iterations of leveling, vertical shifting, height measurement and re-checking are involved. Once such a stationing is established (classically or as proposed in EP 2 998 701), all the subsequent target measurements of this instrument setup are then based on those fixed stationing space coordinates of the surveying instrument center point.

A technical problem which is not at all considered in above mentioned document is the fact that only in theory this one time stationing is fixed, but practically it can deviate during measurement. For example, in many practical cases the surveying instrument—or more precisely the legs of the tripod (or the like) on which it is stationed—tends to sink into ground or to move slightly due to other influences during measurement such as heat, wind, etc. Therefore, also the corrected surveying instrument center point from above is potential not valid throughout all of the measurements taken in this installation.

A re-verification of this corrected surveying instrument center point according to the proposed method during the measurement is not mentioned, as such would obviously be burdensome, since according to the method, the instrument has to be tilted again to point at the reference point to take measurements and then has to be re-leveled again. Such is burdensome, especially when the leveling is done manually, and it would also be error-prone.

Yet, an even bigger disadvantage of a re-consideration of the above described method would be the fact that such would result in a NEW instrument center point as basis for the following measurements, which differs from the previous instrument center point. In surveying, it is preferred and established practice that the surveying instrument center is considered as a fix anchor, which remains fix during all of the measurements taken from this installation. The method of EP 2 998 701 results in new surveying instrument center points each time—which is not desirable in a surveyor view.

BRIEF DESCRIPTION

It's therefore an object of some embodiments of the present invention to improve a surveying instrument and a surveying measurement method, in particular to be less error-prone and to improve the accuracy and/or reliability of the derived measurements. It is therein also preferred to keep measurement accuracy level high and guaranteed for all of the measurements taken over time from this instrument stationing.

Avoidance of errors due to unintentional movements of the surveying instrument, e.g. due to sinking motions of a tripod or another stationing support of the instrument, is also an object.

A specific object can therein be to keep the measurement simple, directly comparable and compatible to prior art measurement results, in particular avoiding additional post-processing.

Those objects are achieved by realising the features of the independent claims. Features which further develop the invention in an alternative or advantageous manner are described in the dependent patent claims.

According to one embodiment of the present invention, those objects are solved by providing a device and/or method with a target point correction according to the invention, which is applied to preferably each measurement target point, especially to correct instrument movements during measurement according to the invention.

Some embodiments of the present invention therefore relate to a geodetic surveying instrument. Such an instrument can in particular be embodied as a total station, but can optionally also be a similar surveying instrument for precise geodetic measurements, especially when having the features mentioned below. A total station therein in particular refers to a geodetic instrument providing a polar coordinate measurement comprising distance and horizontal and vertical angle, having automated functionalities, especially a motorized movement of the axis for aiming a target point.

The surveying instrument is to be stationed at ground coordinates and in a stationing height above ground. By this stationing of the instrument base, the instruments center coordinates are defined. Such stationing can e.g. be established by means of a support for the device like a tripod or the like, by which the surveying instrument is stationed in the field at a desired location.

The surveying instrument can further also comprise a kind of plummet-unit configured for centering the device above ground, preferably with respect to a defined ground reference mark, like e.g. a plummet, a laser plummet, an optical plummet, a camera, etc. The surveying instrument can also comprise a height measurement appliance configured for determining the stationing height of the instrument above ground, preferably e.g. an electronic and/or optical distance meter, etc.

The surveying instrument therein comprises a sighting unit for aiming a measurement target point, in particular one or more measurement target points. The sighting unit can e.g. comprise an optical apparatus like a telescope or the like (comprising an ocular, an objective and an aiming rectile) or an electronic apparatus comprising a camera for an electronic sighting image, or both of those. It comprises an opto-electronic distance meter (EDM) or laser range finder (LRF) built to determine a target distance from the surveying instrument to the measurement target point, or optionally multiple target distances in case of a multi target capable EDM. The EDM can e.g. be based on a time of flight, interferometric and/or phase-shift measurement principle. For aiming the measurement target point, the surveying instrument comprises two axes for aiming the sighting unit, in particular by pivoting and/or tilting the sighting unit with respect to the instrument base. Each of the axes has a goniometer built to determine a target direction of the sighting units aiming. Preferably, those axes can be motorized to be automatically pivoted according to an electric control signal.

The surveying instrument also comprises a tilt sensor, which is built to determine a tilt of the instrument, in particular a tilt value with respect to a direction of gravity or level which can be read out electronically.

A measurement-controller of the surveying instrument is configured to derive measured coordinates of the measurement target point which is aimed, based on the target direction and the target distance measured.

According to some embodiments of the invention, the surveying instrument also comprises a target point correction unit. This target point correction unit is configured to derive a spatial location displacement of the instrument center coordinates, in particular during the surveying. For example, such spatial location displacements can be caused by movements of a supporting tripod or the like, by which the instrument is stationed, e.g. movements due to sunken tripod legs, heating, wind, vibration, impacts, etc.

The target point correction unit, e.g. comprising a microprocessor, derives the spatial location displacement based on the tilt and the stationing height of the surveying instrument and is configured to apply the derived spatial location displacement of the instrument center coordinates on the measured coordinates of the measurement target point, to result in corrected target point coordinates. Those corrected target point coordinates are then provided as measurement results for the target point.

In an embodiment, the target point correction unit can be configured to derive the spatial location displacement of the instrument center location based on the tilt value of the surveying instrument and the stationing height of the surveying instrument by trigonometry, in particular with defining rotational movement around an instantaneous center of rotation at or close by the ground point.

The target point correction unit can be configured to correctively apply the spatial location displacement of the instrument center to the target point coordinates, which displacement can occur due to a tilting of the surveying instrument stationing during surveying, e.g. caused by sunken legs of a tripod by which the surveying instrument is stationed. Applying the spatial location displacement to the target point coordinates can be done while keeping the initial instrument center location as virtually fixed reference—despite of the instrument center actually having spatially moved, which is corrected for by the applying of the displacement to the target point coordinates.

The target point correction unit can also be configured to derive the spatial displacement of the instrument center at the time of measurement of the target point by the instrument, in particular comprising the corresponding target direction and target distance. Preferably, also the tilt value can be determined at the same time or alternatively being interpolated to this measurement time.

The target point correction unit can be configured to correct the derived target point coordinates at each time of measurement of the target point in such a way that the instrument center coordinates are thereby contemplated to be virtually fixed at an initial stationing location. For multiple target point measurements, the derived corrected target point coordinates can be referenced thereto, in particular wherein the spatial location displacement can be derived by an approximated trigonometric function comprising the tilt value in at least two dimensions and the stationing height.

The target point correction unit can therein be configured to derive and apply the target point correction in a substantially horizontal x-y plane only.

The target point correction unit can therein be configured to derive and apply the target point correction in a substantially vertical z direction only.

The target point correction unit can therein be configured to derive and apply the target point correction in a substantially horizontal x-y plane and in a substantially vertical z direction.

The target point correction unit can be configured to derive and apply the target point correction in Cartesian coordinates or in polar coordinates.

The control unit can be configured to derive the corrected target point coordinates with additionally correcting the target direction according to the tilt value from the tilt sensor in such a way, that a corrected target direction is referenced to level.

Some embodiments of the invention also relate to a method for a deriving corrected target point coordinates of measurement data from a geodetic surveying instrument, in particular from a total station. The measurement data comprises at least a target direction and a target distance, forming measured target point coordinates, and also a surveying instrument tilt value. According to the invention, a calculating of a stationing spatial location displacement of the instrument based on the instrument tilt value and an instrument stationing height above ground is established. Thereby a correcting of the measured target point coordinates is done to derive corrected target point coordinates, which are referenced to a virtually fixed stationing location. This is done by applying the calculated stationing spatial location displacement to the measured target point coordinates, while the stationing location is contemplated to be virtually fixed to its initial stationing location of the instrument at instrument setup. This contemplating is in particular done despite of the fact that the instrument center actually has spatially moved.

The method can also comprise at least one of:
stationing a base of the surveying instrument at a site in a stationing height above ground, in particular on a tripod or stand,
aiming a measurement target point by a sighting unit, geodetic surveying of at least one target point with
determining a target distance from the surveying instrument to the measurement target point by an opto-electronic distance meter at the sighting unit and
determining a target direction by goniometers at two axis for pivoting the sighting unit with respect to the base,
determining a tilt value of the base of the surveying instrument with respect to a direction of gravity or level by a tilt sensor and
deriving the target point coordinates in form of target point coordinates of one or more of the target points based on the target direction and target distance by a control unit,
deriving the spatial location displacement of a instrument center due to a tilt movement of the surveying instrument with respect to an initial instrument center location at setup, in particular due to sinking of the surveying instrument setup,
correcting the derived target point coordinates by applying a spatial location displacement of the instrument center location to the target point coordinates and/or
providing thereby corrected target point coordinates, in particular which are referenced relative to the initial instrument center location.

Therein the deriving and applying the target point correction can be done in a substantially horizontal x-y plane and/or in a substantially vertical z direction, resulting in corrected Cartesian target point coordinates. Alternatively, in another embodiment the spatial location displacement can not only be derived and applied to the target point in Cartesian coordinates (x,y,z), but also in Polar coordinates (Hz,V) which are also often used in surveying. Thereby, also measurement results presented in polar (Hz,V) form can represent corrected target point coordinates according to the invention and the surveyor can use the thereby resulting corrected polar target point coordinates of his observations with the common polar formula-framework and thereby gain the accuracy improvements of the present invention also in polar coordinates.

The method can also comprise deriving the spatial location displacement by trigonometric calculations and defining rotational movement around an instantaneous center of rotation at the ground. Deriving the spatial displacement of an instrument center and correcting the derived target point coordinates at each time of measuring the target point can also be an embodiment of the invention.

According to some embodiments of the invention, the deriving the target point coordinates can also be done with additionally correcting the target direction according to the tilt value in such a way, that the target direction is referenced to level by numerically compensating the tilt value of the axis. Such is not to be confused with the present invention, which corrects spatial location movements of the instruments center point, which movements can either be expressed in Cartesian x,y,z or in Polar Hz,V coordinates,— but which is technically different from a simple tilt angle correction of prior art, which leaves the instruments center point location untouched. Nevertheless, in a special embodiment of the present invention, the prior art tilt angle correction can be combined with the present invention of an instrument center point location movement correction, resulting in a correction of the horizon-reference of the angular readings plus a correction of an instrument center point location, latter not given in prior art.

In another embodiment according to the invention, the target point correction is not limited to an absolute correction with respect to an initial tilt of 0 cc. The invention can also relate to a target point correction relative to a non-leveled initial instrument center location, having an initial starting tilt and a corresponding initial starting center point location deviation.

The method, or at least those parts of it which involve computation and/or calculation, can also be embodied as one or more computer program products stored on a machine readable medium or embodied as electromagnetic wave (such as e.g. a wired or wireless data signal). Consequently, the invention further relates to such a machine readable medium and/or a computer program product comprising program code for a target point correction according to the invention. The program code is therein in particular built for executing:
deriving the measured target point coordinates based on a target point distance and a target point direction by the surveying instrument,
gathering an actual value of tilt of the surveying instrument at the time of measuring the target point,
deriving a spatial location displacement of a instrument center at the time of measuring the target point, in particular with respect to an initial instrument center 6 location at time of setup, based on the tilt value of the surveying instrument and on a stationing height of the instrument, preferably by a trigonometric formula, and
correcting the target point coordinates by applying the derived spatial location displacement to the measured target point coordinates, in particular with virtually referencing resulting corrected target point coordinates to the initial instrument center location of time of instrument setup.

The computer program can be executed in a detection device according to the invention, which device therefore also involves a computation means built to run a computer program providing the functionality according to the invention, with or without the computer program actually loaded.

BRIEF SUMMARY OF THE DRAWINGS

Devices, methods and setups according to the invention are described or explained in more detail below, purely by way of example, with reference to working examples shown schematically in the drawing. Specifically.

DETAILED DESCRIPTION

The diagrams of the figures should not be considered as being drawn to scale. Where appropriate, the same reference signs are used for the same features or for features with similar functionalities. Different indices to reference signs are used to differentiate between different embodiments of the same or an equivalent feature that is shown exemplary. The term "substantially" is herein used to describe the fact that a certain value, arrangement or feature does not necessarily need to be 100% exact, but can maybe slightly aberrate, while still being within scope. In other words, there can be some slight deviations, e.g. due to inaccuracies, unintentional, design considerations, tolerances, etc.—but there is a clear tendency towards the mentioned value or arrangement, in particular in view of the technical effect to be achieved therewith. Especially, it is not meant to be an obvious opposite. In any case, besides the meaning of "almost exactly" the term "substantially" can always be interpreted to comprise or also express the meaning of "exactly", or of the particular feature itself.

The herein shown formulas are shown exemplary to explain the basic principle and to show that it is physically and logically possible to work the invention based on the principle according to the present invention. In other embodiments of the present invention, those basic formulas can be modified, e.g. to better match the actual physical conditions. The coordinate indicator 9 shows the orientation of the plane of projection.

Figure 1:
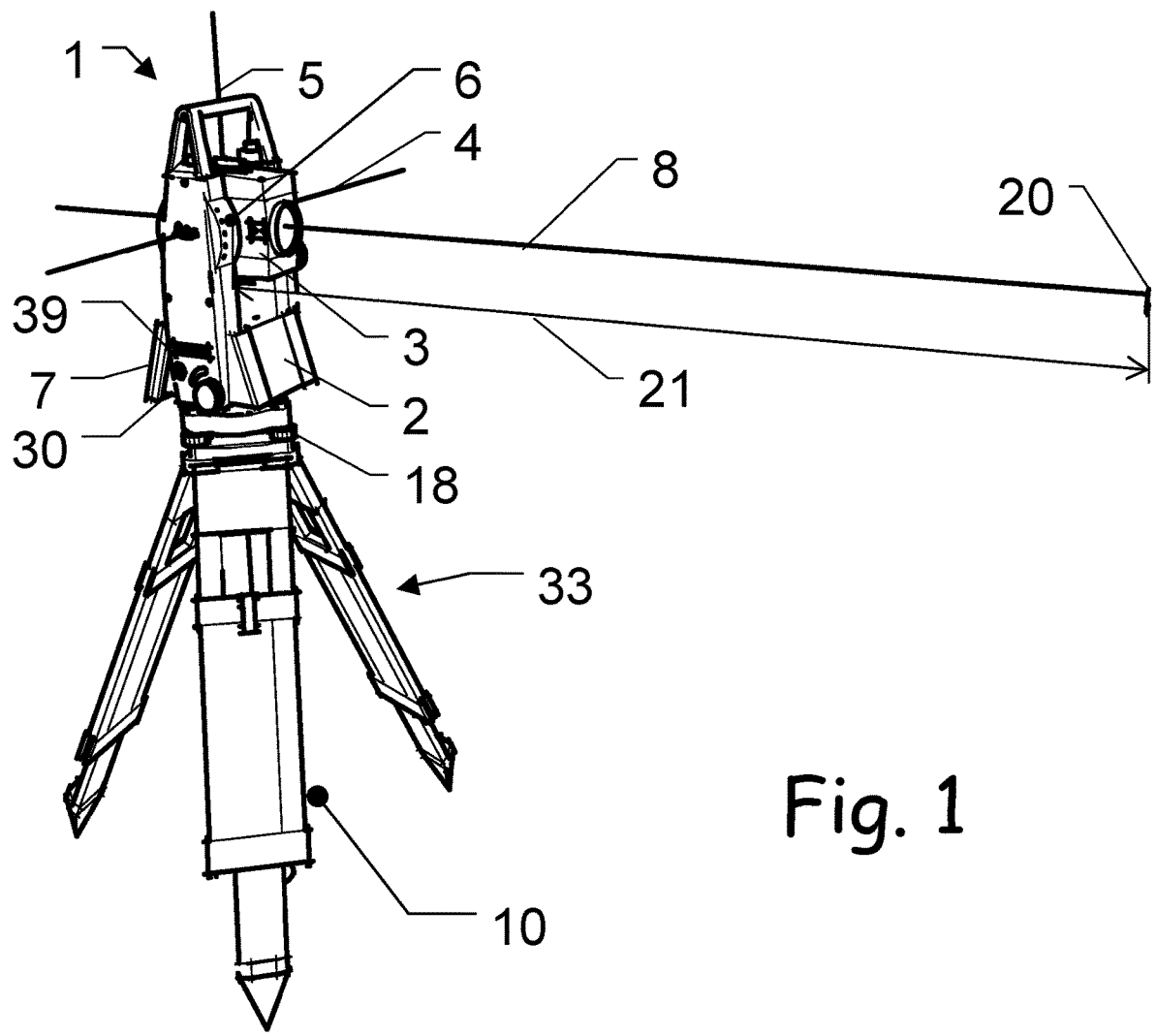
FIG. 1 shows an example illustrating an embodiment of a target point measurement with a surveying instrument according to the invention.

FIG. 1 shows an embodiment of an example of a surveying instrument 1 according to the invention. For example this can be a tachymeter or a total station, also referred to as electronic tachymeter or computer tachymeter, here shown on a tripod 33. An example of such a geodetic measuring apparatus of prior art is e.g. described in EP 1 686 350. Those instruments 1 have electrical-sensor-based angle and distance measuring functions that permit direction 22 of the aiming axis 8 and distance 21 to be determined with respect to a selected target point 20. The angle 22 and distance 21 variables are established in an internal reference system of the instrument 1 and, if appropriate, also can be linked to an external reference system for absolute position determination.

Modern total stations 1 generally have a compact and integrated design, with coaxial distance measuring element and computer, control and storage units usually being present in a device 1. Depending on the configuration level of the total station 1, a motorization of the sighting or targeting apparatus 3 and—when using retro reflectors (e.g. an all-round prism) as target objects 20—means for automated target search and tracking moreover can be integrated. As a human-machine interface, the total station can comprise an attached or detachable electronic display/control unit 7—generally a microprocessor computer unit with electronic data storage means—with a display and input means, e.g. a keyboard. Measurement data detected by electrical sensor means are fed to the display/control unit 7 such that the position of the target point 20 can be established, displayed optically and/or stored by the display/control unit 7. Total stations 1 as known from the prior art can furthermore comprise a radio data interface for establishing a radio connection to external peripheral components such as e.g. a portable data detection device, which, in particular, can be embodied as a data logger or a field computer.

For sighting or targeting the target point 20 to be surveyed, generic geodetic surveying devices 1 have a telescopic sight, such as e.g. an optical telescope or an electronic camera system, as sighting apparatus 3. In general, the telescopic sight can be rotated about an at least substantially vertical axis 5 and about an at least substantially horizontal axis 4 relative to a base 2 of the measuring device 1, such that the telescope can be aligned on the measurement target point 20 to be surveyed by aiming the sighting unit 3, which can involve pivoting and/or tilting.

The optical system or the optical visual channel of the sighting unit 3 or apparatus can e.g. contain an objective lens group, an image erection system, a focusing optical system and a cross-lines grid for producing a reticle and an eyepiece, which, for example, are arranged from the object side in this sequence. The focusing is built to produce an in-focus object image on a cross-lines grid arranged in the focusing plane. This object image can then be observed through the eyepiece and/or detected by means of e.g. a coaxially or in parallel arranged camera for detecting an image, wherein the detected image can be depicted as live image on the display/control unit 7 and/or on a display of a peripheral device which can be used for remote control of the total station 1.

Besides the target point aiming and measurement setup of such a total station 1, it is also equipped with a tilt sensor 30. Such tilt sensors 30 in total stations measure the tilt of the total station 1, preferably in direction of the line of sight and perpendicular to the line of sight, which measurements will in the following be named L for Longitudinal and T for Transversal tilt. Therefore, the tilt sensor 30 sensitivity axes can be aligned with the corresponding measuring axis 4, an instrument coordinate system or a desired leveling plane of the instrument 1, but alternatively a multiple tilt sensor 30 axes can be aligned differently and the result can be numerically transformed to the instruments coordinate system. Such tilt sensor 30 can for example be embodied as micro-g MEMS accelerometers or another unit allowing electronic readout of a value related to tilt, preferably having a fine resolution like a resolution far below 1° or preferably below an arc second.

The tilt value readings L and T of the tilt sensor 30 are known in prior art to be used to provide information for leveling the instrument 1 during setup and/or to correct Horizontal- and Vertical angles to compensate a slightly tilted instrument setup or stationing.

Such a target point measurement can be established with a here shown exemplary total station or multi-station, such as a Leica Multi Station 50 as embodiments of a geodetic surveying instrument 1 which the invention can relate to. Therein, a deviation of the instrument center point 6 location, can happen during measurement after the initial stationing, which is not fully considered in prior art. The shown total station 1, comprises a baseplate 18 defining a pivot axis 5, a structure 2 which is arranged on the base 18 and can pivot relatively to the base 2 about the pivot axis 5, wherein the structure 2 defines a tilt axis 4 which is substantially orthogonal to the pivot axis 5, and comprising a sighting unit 3, in particular a telescopic sight, wherein the sighting unit 3 is arranged such that it can pivot relative to the structure 2 about the tilt axis 4 and has an emission unit with a beam source for generating and emitting measurement radiation along a targeting axis 8. Moreover, the surveying device 1 has a distance measuring functionality for measuring target distances 21 to target points 20, an angle measuring functionality for measuring an alignment of the measurement radiation 8 in a target point direction 22 and a control and processing unit 7 for data processing and for controlling the surveying device 1. The measurement-controller 7 can also comprise the target point correction unit 39 configured to provide the corrected target point coordinates according to the invention. In another embodiment, the target point correction unit 39 can also be standalone or implemented on another computation unit having access to the therefore required measurement data.

When carrying out the target point 20 measuring functionality controlled manually or automatically by the control and processing unit 7, the measurement radiation is aligned highly precisely on at least one target point 20, whereby the desired target point 20 can be surveyed in a geodetically accurate fashion to derive its target point coordinates. A position reference to an external coordinate system can be established by an initial stationing of the instrument 1 at a defined ground mark 10 known in the external coordinate system.

Figure 2:
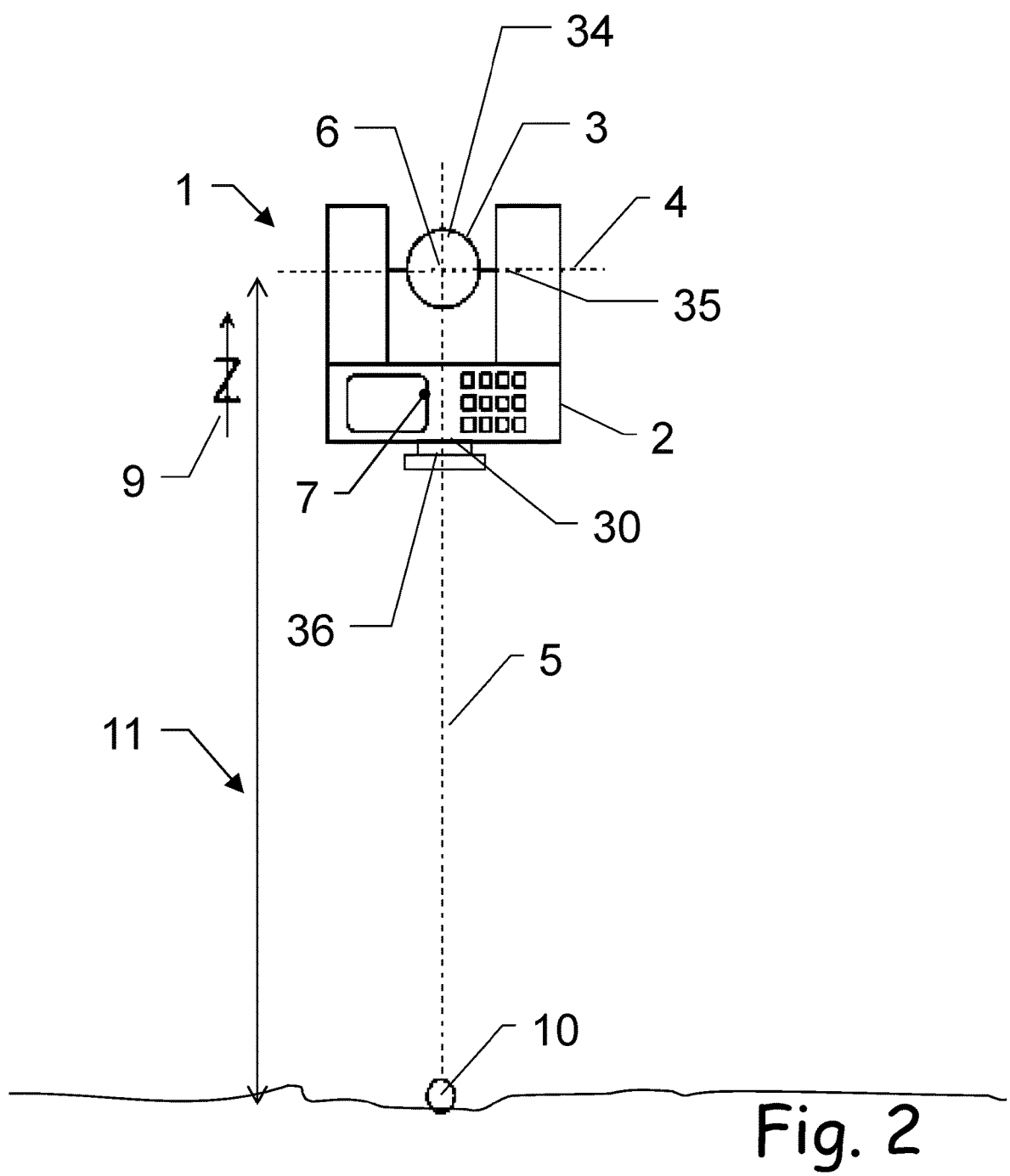
FIG. 2 shows an example of an embodiment of a stationed surveying instrument.

As shown in FIG. 2, total stations 1 are normally set up in a local coordinate reference frame. To use the standard setup and orientation methods it is required that the vertical axes 5 of the total station 1 and coordinate reference frame are parallel. This means the total station 1 is set up vertically over a ground point 10 with preferably exactly known coordinates with a certain instrument height 11. The measured coordinates from this station are then derived by the instrument 1 based on the ground coordinates 10, the instrument height 11, horizontal Hz and vertical V angle by the two axis axes 4,5 for aiming the sighting unit 3, each with a goniometer 35,36 built to determine a target direction 22 and slope distance 21 by an opto-electronic distance meter 34.

In an ideal world the instrument 1 is exactly setup over a survey monument 10 or ground control point 10 and doesn't move during the whole surveying process. But practically, this is seldom the case. In most measurement setups, the instrument 1 will somehow slightly tilt over time during measurement, often because of sunken tripod 33 legs but also due to other impacts.

Figure 3:
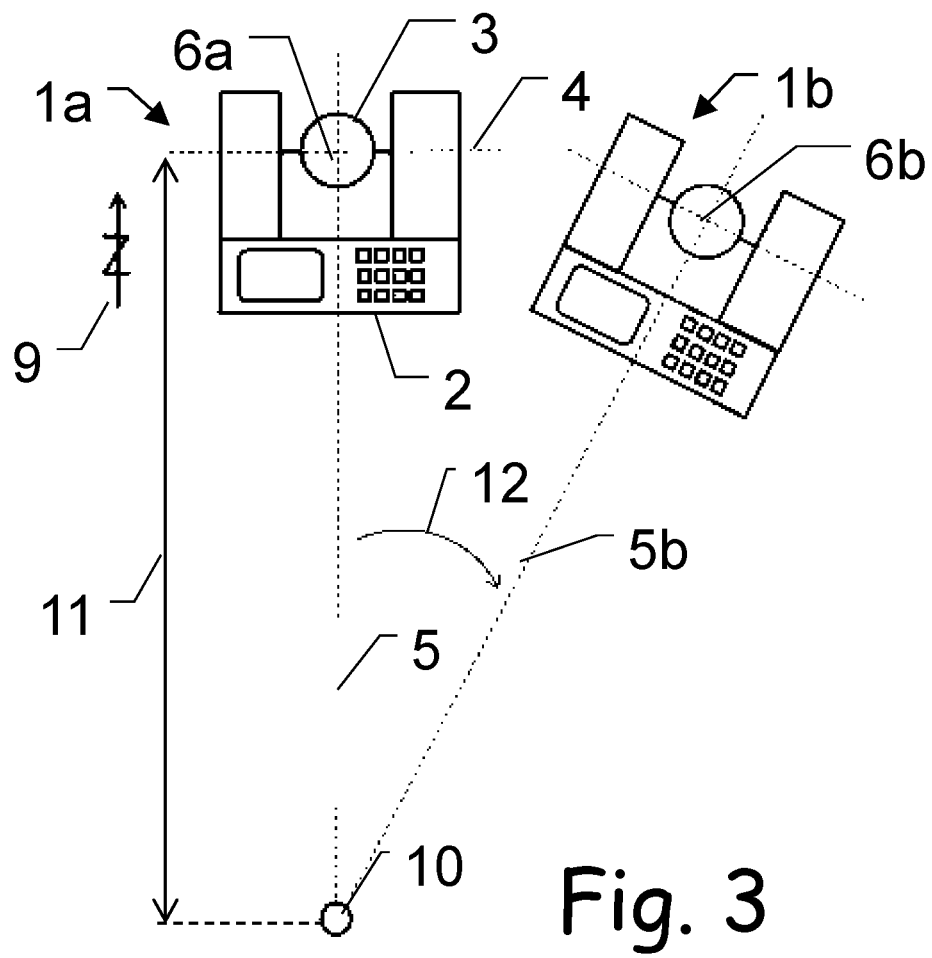
FIG. 3 shows an example of a first embodiment of a surveying instrument getting tilted.

FIG. 3 illustrates an example, where such a sinking motion of a here not shown tripods 33 leg occurred. This sinking leads to a tilt 12 of the instrument 1a,1b, which can be detected by the tilt sensor 30, e.g. in L and T values as specified above. In the figure, the tilt 12 is somehow shown overdone in order to illustrate the invention—practically this tilt can be far less, e.g. in or below the order of magnitude of a few degrees, arc seconds or even below.

The instrument 1a is shown in an initial stationing, where it is leveled and referenced to a ground point 10 in a height 11 above ground 10. The instrument center coordinates 6a are thereby defined according to this initial stationing during instrument setup. The instruments base 2 is pivotable around a vertical axis 5 and with respect to this base 2 the sighting unit 3 is tiltable around a horizontal axis 4—wherein those tilt and pivot values are determined and giving the target direction 22, derived as horizontal Hz and vertical V angle of those axes. The instrument center 6,6a,6b can e.g. be defined at the intercept point of the axes 4 and 5.

Referenced by 1b, a tilted instrument is shown, tilted by the tilt value 12, e.g. due to sinking of one of the (here not shown) tripod legs during the course of the surveying procedure. Thereby, the instrument center coordinates 6b deviate from the initial stationing setup—notwithstanding this, prior art anyhow considers the instrument center coordinates 6a to be fixed during the cores of measurement until new instrument center coordinates 6 are derived by re-stationing. Those displacements might be small in scale, and therefore e.g. not reasonably detectable by a GPS or other supplementary means, but they can still get relevant in terms of geodetic precision in the order of cm, mm or even below.

It is common practice in prior art to detect tilt values and to use them for physical instrument leveling and/or to correct the horizontal and vertical angle readings of the target direction 22 to compensate the out-of-level tilt of the instrument 1 in those target direction readings. Thereby, the instrument 1 is calculating the measured target point coordinates with a horizontal and vertical angle based on the axis 4,5 orientation of a non-tilted total station 1, numerically compensating any tilt or inaccuracy in leveling which is measured and thereby providing angular target direction 22 measurements with respect to an ideal reference system (which is in most cases defined to be exactly leveled). This is a known procedure and available in almost every modern total station 1—and not to be confused with the present invention which concerns a completely different aspect than an angular out-of-level correction—although such does not exclude that an undesired tilt 12 of the instrument 1 can also be compensated in the angular target direction 22 measurement of the present invention.

The present invention concerns another, previously unaddressed issue. There is a second problem arising when the instrument 1 tilts during the surveying process. As discussed, at the start of the survey, the instrument 1 was set up exactly over a known reference or control point 10 or alternatively the instrument coordinates 6 were derived with a resection or similar. All following target point 20 observations and calculations are then based on this assumption that the instrument center 6 is located at this instrument center point 6a which has been defined once at installation of the instrument 1, and does not move. But if the total station 1 tilts over time, then not only the angular axis measurements are affected, but also the instrument center 6b moves away from its original exact spatial location or position 6a.

Figure 4:
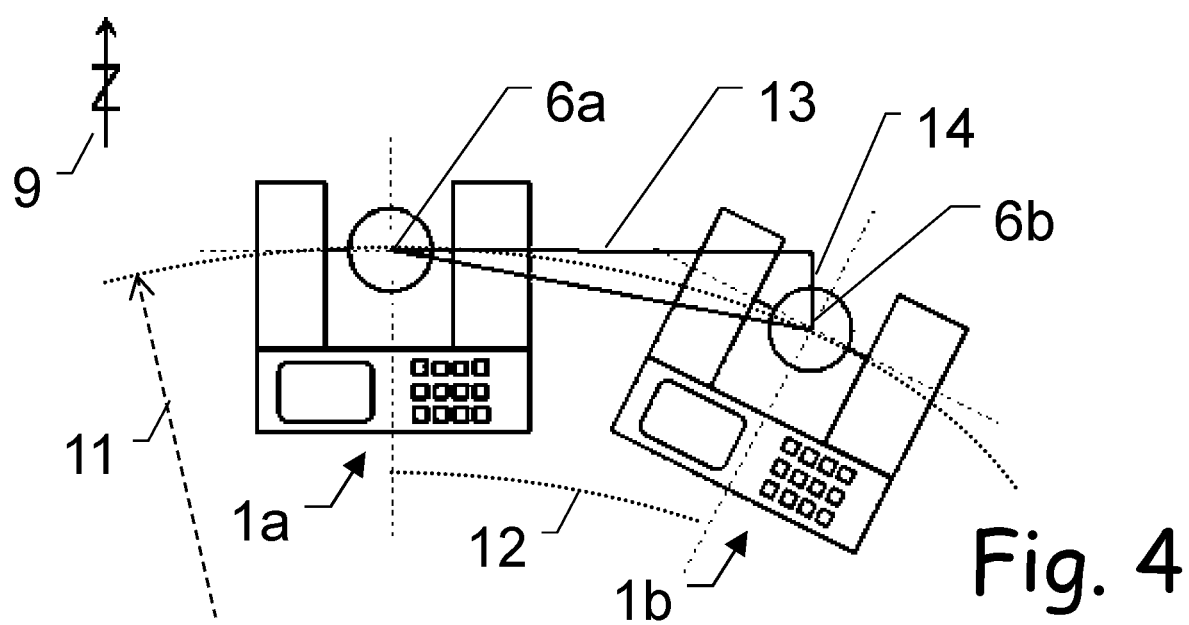
FIG. 4 shows an example of an illustration of a spatial location displacement according to the invention.

An example on how the invention can be embodied is illustrated in FIG. 4, showing a frontal close-up of the instrument 1. Once stationed, the movement of the instrument center 6a to 6b—e.g. due to sinking of the structure which the instrument 1 is stationed on (e.g. the tripod 33)—are derived and those movements are translated in movements of the target point coordinates according to the invention. Apparently, the movements are monitored according a reference position 6a, in particular according to the reference position of the instrument center 6a at the time of initial setup of the instrument center 6 at the time of stationing the total station 1 over a ground point 10. The amount of displacement due to the movements depends not only on the tilt values 12, but also on the instrument height 11 of the total station 1. The higher the total station center 6 is located over a ground point 10, the bigger is the spatial displacement for the same tilt value 12. For example, in one embodiment of the invention, the movement can be modeled in a simplified manner as a local instantaneous center of rotation of the tilting movement 12, which can be considered to be defined by the instrument height 11. Modeling in a simplified manner based on a local instantaneous center of rotation might not yield completely precise results, but provides useful approximation and represents an improvement in measurement accuracy compared to conventional methods. The present invention can also be applied in the same manner when the total station center 6 is not initially referenced to an external coordinate system, but e.g. only relative measurements are executed.

According to the present invention, such spatial location displacement is preferably derived by a detected tilt 12 at the time of the target point measurement and based on known total station 1 geometry, in particular of the stationing height 11. In the simple embodiment this can be achieved with help of trigonometric formulas. Even if those trigonometric formulas do not exactly match the specific tilting movement, they still can bring a reasonable increase of accuracy. Alternatively, also more complex formulas or numerical models can be used, in particular if there is a specific and known geometry of the stationing considered.

Figure 5:
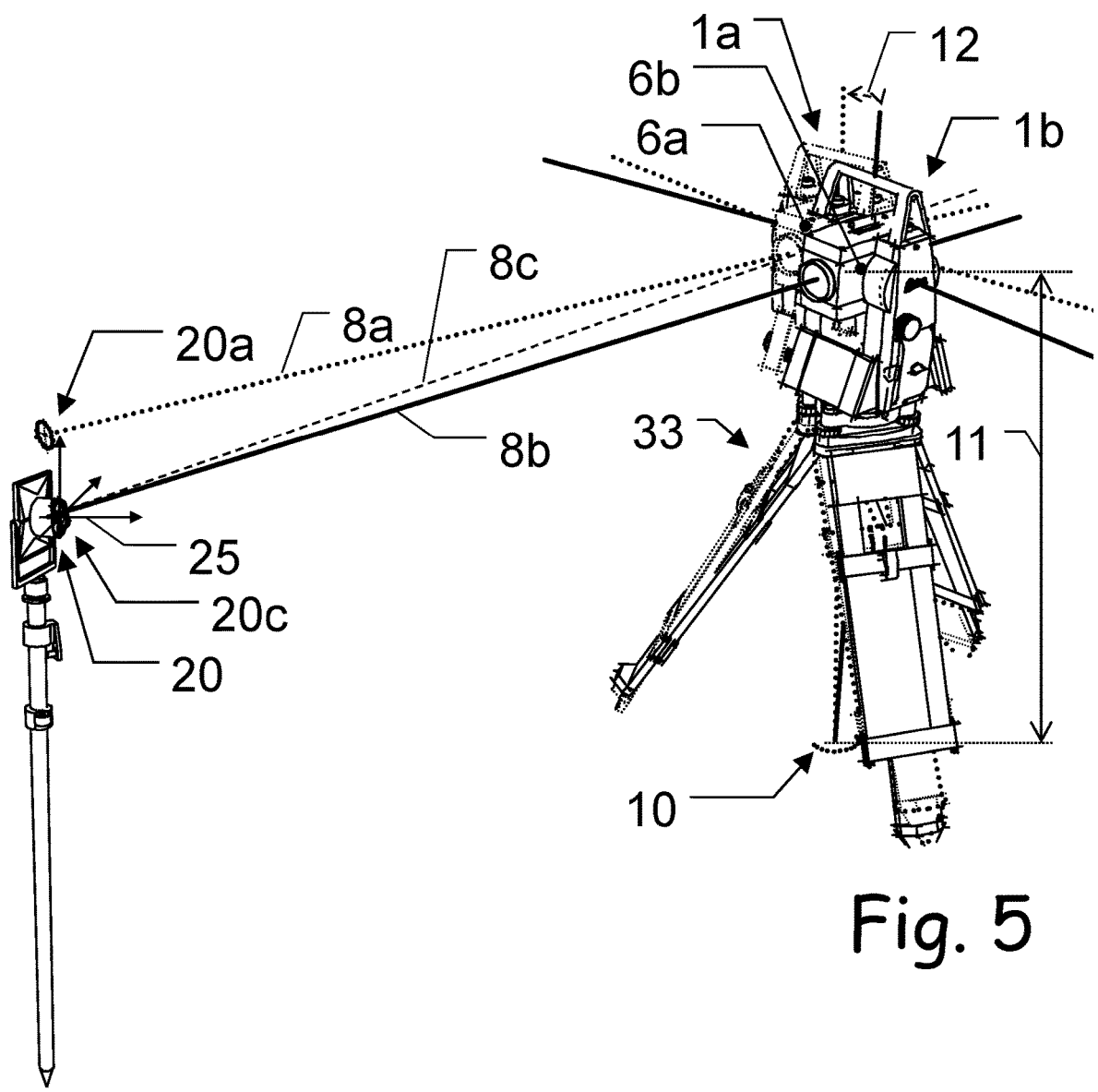
FIG. 5 shows an example illustrating an embodiment according to the invention.

FIG. 5 shows an example of a surveying of a target point 20 according to the invention. Therein, the invention provides corrected target point coordinates 25 with increased accuracy with the help of applying a derived displacement of the surveying instrument center 6 on the measured target point coordinates, preferably for each target point measurement individually and up to date.

Almost all electronic total stations on the market are equipped with a tilt sensor 30 that determines a tilt value 12 of the total station 1. In the known instruments, those tilt values are then used to correct the angular readings in a way that the measured angles correspond to a non-tilted, exactly leveled total station 1. But a movement of the instrument center 6 is not even mentioned to be corrected those prior art instruments 1. Beside this angular reading correction, the initially referenced document EP 2 998 701 proposes that during the initial setup, an imperfect instrument setup can be made tolerable when the initial stationing referencing derives the resulting instrument location of the imperfect instrument setup. Regarding a sinking, EP 2 998 701 only mentions that thereby more time is required to initially set up the surveying instrument 1—wherefore the faster setup proposed in EP 2 998 701 is advantageous in view of the time required for the initial or subsequent manual stationing. In such an initial setup, an active turning on the foot screws of the tribrach to adjust the instrument leveling is proposed. Such is not what happens when a tripod leg sinks and which would be disadvantageous to be done during a measurement.

In other words, in prior art, the initial determining of the total station center 6 during setup—which will be the basis for all further measurements—is therein eased by a spatial surveying of the reference mark 10, instead of establishing an exact setup over the reference mark 10 as it was done classically.

Some of the advantages that can be gained by the present invention—when applying a spatial location displacement of the total station center 6 for the measurements onto the derived target point coordinates 25 (and not on the station point 6 coordinate)—are exemplary discussed hereafter.

The most common tilt 12 incident during the total station survey is a sinking of tripod legs. As such happens in the course of measuring, this means that actually, each, multiple or at least one of the target point 20 measurements at this stationing are in fact related to a differing instrument center point 6b, in particular in space coordinates in the horizontal level plane or in three lateral dimensions—but such is not considered in prior art. Prior art at most considers angular leveling correction of such a tilt 12 during measurement.

In prior art, the measured coordinates are still considered to be based on the initially fixed instrument center point 6a—although in view of the present invention, such sinking renders this to be not exactly correct anymore, which is generally neglected in prior art nor is there even an awareness that such a problem could even exist.

Also, trying to apply the teaching of above mentioned EP 2 998 701 multiple times, and thereby deriving a multiple new instrument center points 6a,6b, . . . for each or multiple measurements from the same instrument stationing would not be satisfying. It is appreciated that the instrument center point 6 is fixed for multiple measurements and does not differ for each of the measurements without the instrument 1 being actually re-stationed. Also many general surveying principles demands on the fact (or assumption) that the instrument center point is a fixed anchor.

With the described functionality according to the present invention, the majority of users will benefit from more accurate measurements and/or time savings in the field.

Another aspect of the present invention can be that it is not only possible to monitor the tilting process over time and to correct the target coordinates 25. The invention also allows to set up the total station 1 tilted over a ground point 10, as it compensates for all possible errors. Thereby, for example, the instrument leveling can be omitted at all—or at least demands on leveling accuracy can be relaxed.

Furthermore, as said above, at the time the total station 1 was set up over a known ground point 10 (or unknown ground point when using the resection method) it was former assumed that the instrument setup is correct and the total station center 6a is located exactly over a marker 10 and the total station coordinates 6 should remain fix and act like an anchor. According to the present invention, at least virtually, the total station coordinates 6a remain unique for all the target point measurements, as—if necessary—the target point measurements 25 are corrected for possible deviations, but the resulting target point coordinates are always related to the fix anchor of the total station center 6a at initial setup location.

Another advantage can be that the tilt reading at the time of the measurement can be used to correct the target point coordinates 25. This has the advantage that not hundreds of station point coordinates 6a,6b, . . . have to be computed during the measurement process from one station. Also computing new station coordinates 6b in a certain frequency doesn't meet the customers requirement of having always the correct target point coordinates (and in particular not having to bother with possible stationing problems, but focusing on the actually derived target point measurements). By using discrete tilt values 12 at the time the target point measurement was executed, such can be established according to the present invention.

Yet another aspect is that very often, setup calculations and survey observations need to be post processed. It can also be possible to re-compute the influence of a tilted total station 1b with the tilt readings 12 connected with the target measurements in a survey data database—which can be considered as another aspect of the present invention. Furthermore, in a special embodiment according to the invention, the correction of target coordinates with the tilt readings 12 of the total station 1 can be offered to survey data which was not captured with a total station 1 that contains this special feature. As long tilt readings are (in particular temporally) assigned to the measurements, the target coordinates can be corrected in a post processing software.

Once stationed, the movement of the instrument center 6, e.g. from 6a to 6b due to sinking of the structure which the instrument 1 is stationed on (e.g. the tripod 33), can in particular be divided in a horizontal component in X and Y direction and in a vertical component in Z direction. According to the invention, those movements are translated in movements of the target point coordinates 25. As also indicated in FIG. 4, those movements can in one embodiment be calculated with help of trigonometric formulas, for example by determining Cartesian offsets dX & dY & dZ with respect to the target coordinates or alternatively by determining polar offsets dHz & dV with respect to the target observations. For example the spatial location displacements can be calculated by:

$$dx = h \cdot \sin(Th) \cdot \cos(Th),$$

$$dy = h \cdot \sin(Tn) \cdot \cos(Tn),$$

$$dz = h \cdot (\sin T)^2,$$

with h=stationing height 11 and T=tilt value 12, Th=tilt value 12 in direction of the horizontal tilting axis 4, Tn=tilt value 12 orthogonal to the horizontal tilting axis 4. Respectively, due to the fact that the underlying geometric model is also only an approximated and/or due to the usually small amounts of angular changes, also known approximations (e.g. according to Maclaurin or others), like $\sin T \approx T$, $\cos T \approx 1 - (T^2/2)$, etc. (T in radiant, of course). Preferably the formulas can be evaluated in practical experiments and then be optimized, e.g. according to experimental results.

As shown, the stationing instrument 1a location tilted to instrument 1b location, whereby the instrument center point also deviated from 6a to 6b. Now, the instrument 1b is used to survey the target point 20, here embodied at a surveying pole, to derive its target coordinates by its measured aiming 8b, comprising direction and distance. But neglecting tilt displacement, referenced to the initial stationing of the instrument 1a and the corresponding center point 6a, this would result in a false target point 20a as indicated by 8a. Therefore, according to the invention, the target point coordinates measured by 8b, are applied with a location displacement x,y,z of the instrument center coordinates from 6a to 6b, resulting in corrected target point coordinates 25 referenced to the instrument center coordinates 6a without tilt, as indicated by the virtual corrected measurement 8c. The resulting corrected target point 20c which coordinates are provided by the instrument 1 are those of the real target point 20 with respect to the thereby virtually fixed center point 6a of the instrument. According to the invention, the location displacement x,y,z of the instrument center coordinates are therein derived based on the tilt value 12 and the instruments stationing height 11.

Figure 6A:
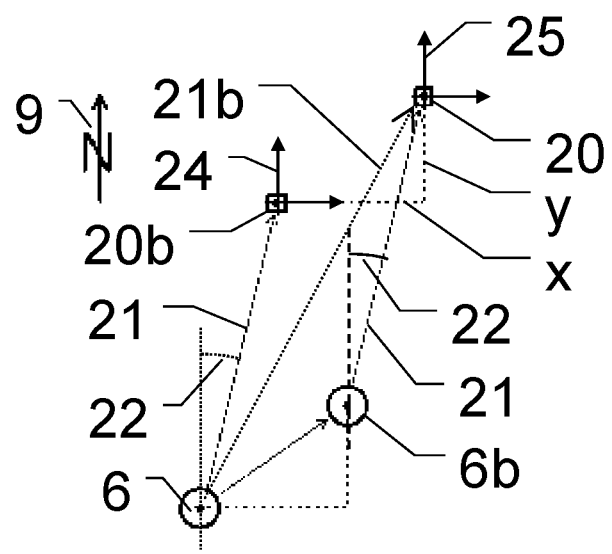
FIG. 6a shows an illustration of a first example of a target point correction according to the invention.

As illustrated in an example of an embodiment in FIG. 6a, a horizontal component of the spatial location displacement can be calculated and applied as follows.

The instrument 1 is stationed with its instrument center 6, preferably referenced to an external coordinate system, e.g. by a ground point 10 at which the instrument is stationed as described before. Then, during measurement, the instrument tilts, e.g. due to sinking of a tripod leg or another influence, such that the instrument center 6 suffers a spatial location displacement, moving to location 6b. From this location 6b a measurement of the real target point 20 is executed, resulting in the measured target point coordinates with target distance 21 and target direction 22. If the tilting displacement is not considered—such as in prior art—the result would be a measured target point 20b, which is not correct.

According to the invention, the target point coordinates are corrected by applying the spatial location displacement of the instrument center due to tilt (and dependent on the stationing height) to the measured target point coordinates, resulting in corrected target point coordinates. Those corrected target point coordinates are not the pure actually measured values of target direction and distance, but are virtually referenced to the initial stationing instrument center coordinates by means of the described correction of the spatial location displacement induced by the tilt and applied to the target point coordinates, which is done according to the present invention. This is not to be confused with a correction of the instrument center 6 location itself, by which a totally different technical effect is achieved, as the basis of the measurement would moved to 6b and could thereby differ for each of the measurements, which is not desirable. It can also be seen in this figure, that according to the target point correction of the present invention not only an angular correction occurs, but also the measured target distance 21 is corrected to derive a corrected target distance 21b of the corrected target point coordinates 25, virtually referenced to the initial instrument center 6—(of course only if the actual sinking displacement results in a change of this value). To illustrate this visually, the corrected target point coordinates are here shown in polar coordinates 21b—although the same applies when considered in Cartesian or other coordinates.

All angular measurements are based on the reference direction of the angle measurement system. This is mostly the 0-direction, which normally corresponds with the azimuth to north direction 9 of the instrument. According to tilt 12 and stationing height 11, it is calculated that the initial instrument center 6 has a spatial location displacement to the actual instrument center 6b. This means the amount of the spatial location displacement in X and Y has to be calculated and applied according the reference direction of the total station 1. The derived horizontal displacement in x and y due to an actual sinking-tilt has to be applied to the measured target point coordinates 25 which are determined in terms of target distance 21 and target direction 22 from the instrument center 6b. For example such can be done by the means of Cartesian offsets x & y on the target coordinate 24 or—dependent in which kind of coordinate system the measurements are taken, alternatively by means of a polar offset dHz to the target observations. Thereby, corrected target coordinates 25 result, which represents a correct location 25 of the actual target point 20, referenced to virtually fixed stationing 6 of the instrument center at its initial stationing location (which in reality has moved by then to 6b). According to an aspect of the invention only those horizontal components x,y of the spatial location displacement can be considered in correcting the target point coordinates 24 to a corrected target point coordinates 25, in particular as the horizontal components x,y tend to be generally larger than the vertical z ones due to the stationing height 11. In such a reduced embodiment, instead of an optional full x,y,z correction, a correction can be done in horizontal x,y only, e.g. if due to the given geometries a vertical z correction would be of neglectable small size, in particular for small tilt values e.g. about or below 1°.

Figure 6B:
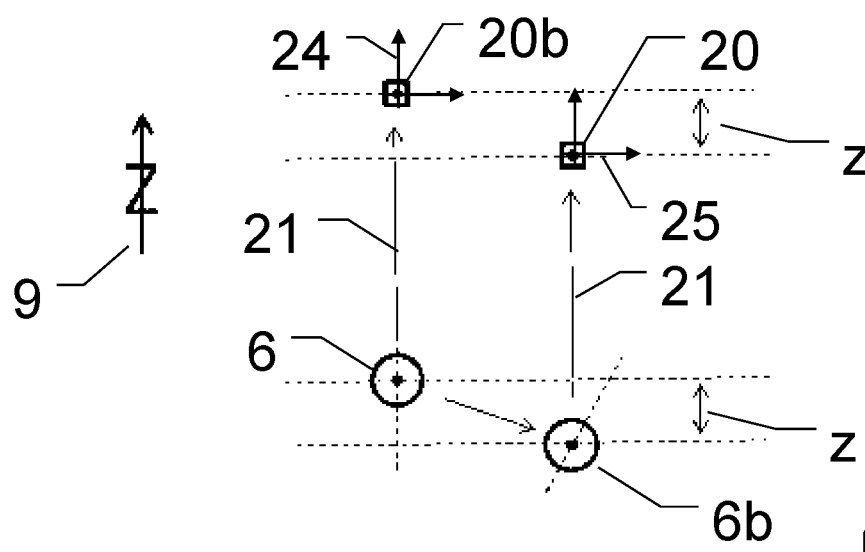
FIG. 6b shows an illustration of a second example of a target point correction according to the invention.

As illustrated in an example of an embodiment in FIG. 6b, a vertical component of the spatial location displacement from 6 to 6b can be calculated and applied, in particular independently of the viewing direction of the total station 1. The principle according to the invention is the same as described above for the horizontal component, but applied to vertical. The amount of displacement z has to be added (with the correct sign, of course) to the uncorrected target coordinate 24 of the vertical observation of the target point 20 to result in corrected target point coordinates 25, which relate to the initial setup instrument center 6.

In a special embodiment of the invention, a separate correction of horizontal and vertical location displacement can be established. Depending on the operator's requirement, the correction of target point coordinates based on tilt sensor data can either be applied only horizontally, only vertically or horizontally and vertically. If a non-Cartesian coordinate system is used, similar consideration can be applied.

In a special embodiment of the invention, a correction of target coordinates can be established from one or more discrete tilt thresholds onwards or alternatively from one or more discrete displacement thresholds onwards. For example, depending on the operator's requirement, the correction of target point coordinates 25 with tilt sensor data 12 can be started from a certain amount of tilt onwards or from a certain amount of tilt onwards in certain steps.

In a variant of this special embodiment of the invention, a correction with tilt sensor plane consideration can be established. For example, in certain surveying environments the tilt sensor 30 might not be able to deliver a discrete tilt value 12 for each measurement—for instance on vibrating underground or during high dynamic applications such as machine control or other target tracking. In such situations, the tilt sensor 30 can freeze an undisturbed tilt state and a number of subsequent measurements can be corrected with this frozen tilt state, until a new undisturbed tilt can be measured.

In an embodiment of the invention which is used in stake out applications, the displacement of the total station center 6 in X, Y and/or Z can be applied in opposite direction, in order to establish an improved accuracy of the stake out. For example, the total station 1 can comprise and provide a dedicated stake out mode in which the direction of the correction of the target point coordinates according to the invention is inverted in sign.

In another embodiment of the invention, when a checking of the orientation of the total station 1 (e.g. by rotation of the telescope) is executed, the correction of the target point coordinates also has to be considered specifically. Checking the orientation of the total station 1 also requires a special treatment of the tilt of the instrument 1, as the displacement in X, Y and Z has to be applied on the original backsight coordinate in order to derive updated reference coordinates to check orientation, distance to target and height difference. The total station 1 can consider this in its correction routines, e.g. by providing specific checking modes where the corrections are applied accordingly.

In an embodiment of the invention in form of an onboard or robotic use cases, the present invention in general as well as its specific modifications discussed above, can be valid for two person survey, where the computation 7 takes place onboard the total station 1, as well as for a one person survey, where the computation takes place on a connected mobile computer device.

In an embodiment of the invention in which the instrument 1 is not exactly set up over ground point 10, the features of the present invention can be combined with other features to ease the setup process. For example, it is not required that a virtual enlargement of the vertical axis of the total station exactly meets a ground reference point 10. For example an initial shift of the vertical axis can be determined with a camera that points down to the ground point 10, or by other known means, whereby the present invention can also work with a total station 1 which initially is not exactly setup over a ground point 10, Summarized and in other words, the present invention can be described to provide the user with a feature to improve the target measurement accuracy of his total station instrument 1. In prior art, a displacement of the total station center 6 due to tilt 12 during the survey is not respected. Under normal surveying conditions it is quite common that the total station center 6 can move by mm range or more during measurement. According to the present invention, such a movement, e.g. due to tripod sinking or other deviations, are not neglected any more—which makes sense since the system accuracy of state of the art total stations are in general of higher accuracy than those movements.

Furthermore the present invention allows installing a tilt sensor 30 with an even larger working range than the existing one. In theory the problem described above would be much more prominent but make up with the correction of the target point coordinate due displacement of the total station center 6.

According to the invention, another advantage can be that the user doesn't need to permanently check the tilt of the total station 1. With prior art total stations 1 it would be required to re-level and re-position the instrument 1 over the ground point 10, if tilting is detected during measurement, which finally would require a new setup to orientate the total station 1. This is a time consuming process which can be saved according to the invention as simply the derived target point coordinates are corrected.

Figure 7:
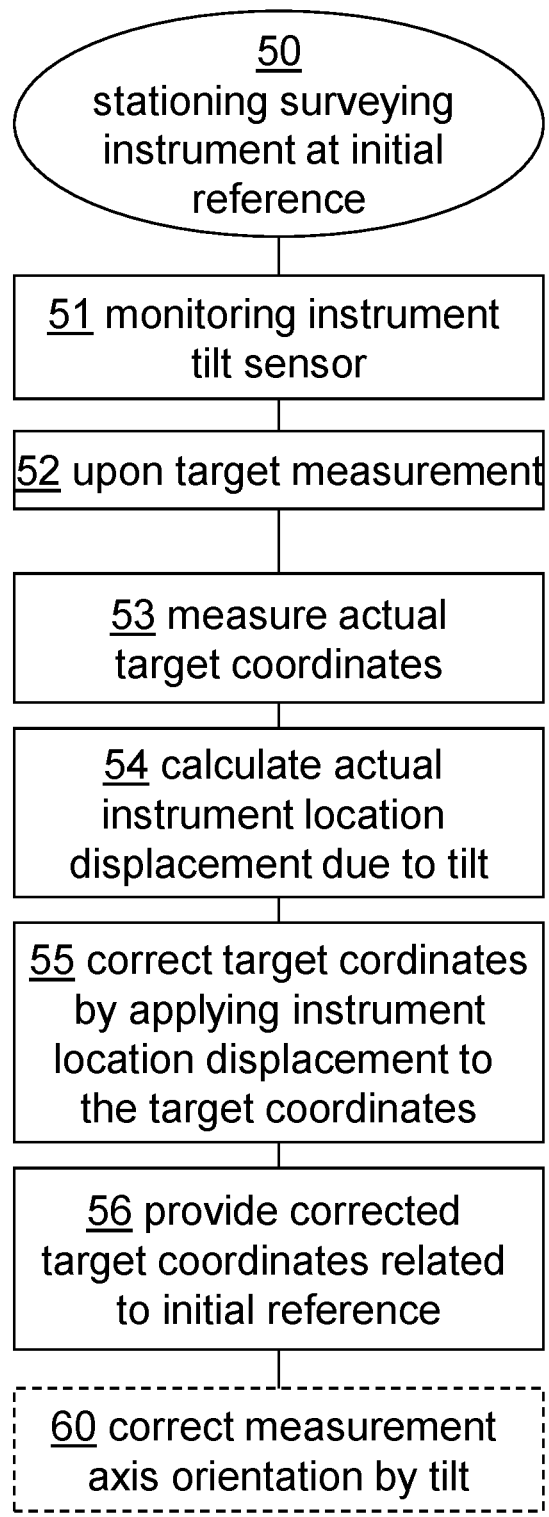
FIG. 7 shows an example of a block diagram illustrating the principle of a target point correction according to the invention.

A target point correction according to the invention can therein be embodied as a method for a deriving geodetic target point coordinates by a geodetic surveying of at least one target point 20 by a surveying instrument 1 comprising steps as shown in the example of a basic block diagram of FIG. 7.

In block 50, a stationing of a surveying instrument 1 at a site in a stationing height 5 above a ground point 10 is done. For example such stationing can be done by erecting a tripod above a ground mark and mounting the surveying instrument 1 thereto.

In block 51, a determining a tilt value 12 of the surveying instrument 1 is done. Such can e.g. be achieved with a tilt sensor 30, like one or more level or gravity sensors, with are determining a tilt value with respect to a direction of gravity or level.

In block 52, a deriving of measurement data at the time of target point measurement is done by aiming a measurement target point 20 by a sighting unit 3 and triggering a measurement, whereby a target direction 22 and a target distance 21 from the measurement instrument 1 to the target point 20 at the triggering time is captured by the instrument 1. The instrument therefore comprises an opto-electronic distance meter and goniometers at two axis for pivoting and tilting the sighting unit 3. The two axes can in particular be motorized to be moved based on an electrical signal.

In block 53, based on the measurement data which comprises the target direction 22 derived by the goniometers, the target distance 21 derived by the opto-electronic distance meter and an instrument tilt value 12 derived by instrument tilt sensor, a determining of a target point coordinate of one or more target points 20 is done by the therefore configured control unit 7.

In block 54, a calculating of a spatial stationing location displacement of the instrument 1 is done, based on the instrument tilt value 12, in particular based on a difference of an initial instrument tilt value at the time of stationing of the instrument 1 and an actual instrument tilt value at the time of target point measurement, together with an instrument stationing height 11 above ground. For example this spatial stationing location displacement calculation can be achieved by simple trigonometry, but alternatively also by more complex models of the stationing geometry of the instrument 1.

Thereby a deriving of a spatial displacement (x,y,z) of the instrument center 6b due to a tilt movement of the surveying instrument 1 with respect to an initial instrument center 6 location at setup, e.g. due to sinking of the surveying instrument 1 setup or other incidents, is derived.

In block 55, a correcting of the target point coordinates to a virtually fixed stationing location 6 is done by applying the calculated stationing location displacement (x,y,z) to the target point coordinates. In this process done by a target point correction unit 39, the stationing location 6 is contemplated to be virtually fixed to an initial stationing location 6,6a of the instrument 1 and the target point coordinates are corrected (not the actually displaced stationing location but the target point coordinates).

By this correcting of the derived target point coordinates by applying a spatial displacement/deviation (x,y,z) of the instrument center location 6 to the target point coordinates, corrected target point coordinates are provided.

In block 56, a thereby refined geodetic measurement is provided as corrected target measurement coordinates. Those corrected target measurement coordinates are so to say virtually based on a non-deviated instrument center 6, as if there would have been no tilt movement of the instrument 1 and it would indeed be exactly fixed at its initial stationing for of the measurements.

In block 60, optionally an additional numerical correcting of the horizontal angle and the vertical angle determined by the instrument is done based on the tilt values 12, in such a way that those angles are meeting level. Thereby, according to an aspect of the invention, a tilt correction is established in six degrees of freedom.

A skilled person is aware of the fact that details, which are here shown and explained with respect to different embodiments, can also be combined with details from other embodiments and other permutations in sense of the invention.

What is claimed is:

1. A geodetic surveying instrument stationed at ground coordinates at a stationing height above ground, whereby instrument center coordinates are defined, the geodetic surveying instrument comprising:
    a sighting unit configured to aim a measurement target point, the sighting unit comprising an opto-electronic distance meter configured to determine a target distance;
    two axes for aiming the sighting unit, each with a goniometer built to determine a target direction;
    a tilt sensor built to determine a tilt value of the instrument;
    a measurement-controller configured to derive measured coordinates of the measurement target point based on the target direction and the target distance of the measurement target point;
    a target point correction unit configured to derive a spatial location displacement (x,y,z) of the instrument center coordinates based on the tilt values and the stationing height and configured to apply the derived location displacement (x,y,z) of the instrument center coordinates on the measured coordinates of the measurement target point, to result in corrected target point coordinates referenced to the instrument center coordinates without tilt,
    wherein the corrected target point coordinates are provided as measurement results for the target point.

2. The surveying instrument according to claim 1, wherein the target point correction unit is further configured to derive the spatial location displacement of the instrument center location based on the tilt value of the surveying instrument and the stationing height of the surveying instrument by trigonometry.

3. The surveying instrument according to claim 1, wherein the target point correction unit is configured to correctively apply the spatial location displacement of the instrument center to the target point coordinates due to tilting of the surveying instrument stationing during surveying caused by movements of a tripod on which the surveying instrument is stationed, while keeping the initial instrument center location as virtually fixed reference, despite of the instrument center actually being spatially moved.

4. The surveying instrument according to claim 1, wherein the target point correction unit is further configured to derive the spatial displacement (x,y,z) of the instrument center at the time of measurement of the corresponding target direction and target distance.

5. The surveying instrument according to claim 1, wherein the target point correction unit is further configured to correct the derived target point coordinates at each time of measurement of the target point such that the instrument center coordinates are thereby virtually fixed at an initial stationing location for a plurality of those target point measurements and the derived corrected target point coordinates are referenced thereto.

6. The surveying instrument according to claim 1, wherein the target point correction unit is further configured to derive and apply the target point correction in a substantially horizontal x-y plane.

7. The surveying instrument according to claim 1, wherein the target point correction unit is configured to derive and apply the target point correction in a substantially vertical z direction.

8. The surveying instrument according to claim 1, wherein the target point correction unit is further configured to derive and apply the target point correction in polar coordinates.

9. The surveying instrument according to claim 1, wherein the control unit is further configured to derive the corrected target point coordinates and correct the target direction according to the tilt value from the tilt sensor such that a corrected target direction is referenced to level.

10. A method for a deriving corrected target point coordinates of measurement data from a geodetic surveying instrument, the measurement data including a target direction and a target distance, forming measured target point coordinates and an surveying instrument tilt value, the method comprising:
    calculating a stationing location displacement (x,y,z) of the instrument based on the instrument tilt value and an instrument stationing height above ground; and
    correcting the measured target point coordinates, to derive corrected target point coordinates which are referenced to a virtually fixed stationing location, by applying the calculated stationing location displacement (x,y,z) to the measured target point coordinates.

11. The method according to claim 10, further comprising:
    stationing a base of the surveying instrument at a site in a stationing height above ground;
    aiming a measurement target point using a sighting unit;
    geodetic surveying of at least one target point with:
    determining a target distance from the surveying instrument to the measurement target point by an opto-electronic distance meter at the sighting unit;
    determining a target direction by goniometers at two axes for pivoting the sighting unit with respect to the base;
    determining a tilt value of the base of the surveying instrument with respect to a direction of gravity or level by a tilt sensor;
    deriving the target point coordinates in form of target point coordinates of one or more of the target points based on the target direction and target distance by a control unit;
    deriving the spatial location displacement (x,y,z) of a instrument center due to tilt movement of the surveying instrument with respect to an initial instrument center location at setup;
    correcting the derived target point coordinates by applying a spatial displacement (x,y,z) of the instrument center location to the target point coordinates; and
    providing thereby corrected target point coordinates.

12. The method according to claim 10, further comprising:
    deriving the spatial location displacement by trigonometric calculations; and
    defining rotational movement around a instantaneous center of rotation at the ground.

13. The method according to claim 10, further comprising:
    deriving the spatial displacement (x,y,z) of a instrument center; and
    correcting the derived target point coordinates at each time of measuring the target point.

14. The method according to claim 10, further comprising:
    deriving the target point coordinates with additionally correcting the target direction according to the tilt value in such a way that the target direction is referenced to level.

15. A computer program product comprising program code stored on a non-transitory tangible machine-readable medium for correcting target point coordinates of a surveying instrument, the computer program product configured for executing:
    deriving target point coordinates by measuring a target point in a target point distance and a target point direction by the surveying instrument;
    gathering an actual value of tilt of the surveying instrument at the time of measuring the target point;
    deriving a spatial location displacement (x,y,z) of an instrument center at the time of measuring the target point with respect to an initial instrument center location at time of setup, based on the tilt of the surveying instrument and a stationing height of the surveying instrument; and
    correcting the target point coordinates by applying the derived spatial location displacement to the target point coordinates.

* * * * *